United States Patent
Horita

(10) Patent No.: US 7,683,944 B2
(45) Date of Patent: Mar. 23, 2010

(54) FILTER PROCESS FOR OBTAINING A SOFT FOCUS PICTURE IMAGE

(75) Inventor: Satoru Horita, Tochigi (JP)

(73) Assignee: Hoya Corporation, Tokyo (JP)

( * ) Notice: Subject to any disclaimer, the term of this patent is extended or adjusted under 35 U.S.C. 154(b) by 1247 days.

(21) Appl. No.: 10/657,172

(22) Filed: Sep. 9, 2003

(65) Prior Publication Data

US 2004/0051794 A1   Mar. 18, 2004

(30) Foreign Application Priority Data

Sep. 12, 2002   (JP) .......................... P2002-266979

(51) Int. Cl.
*H04N 9/68* (2006.01)
*G06K 9/40* (2006.01)

(52) U.S. Cl. .................. 348/234; 348/235; 382/264

(58) Field of Classification Search ................ 348/234, 348/235, 236, 237, 248, 260, 299, 300, 222.1; 382/264

See application file for complete search history.

(56) References Cited

U.S. PATENT DOCUMENTS

| | | | |
|---|---|---|---|
| 5,541,648 A * | 7/1996 | Udagawa et al. .......... 348/222.1 |
| 5,581,298 A * | 12/1996 | Sasaki et al. ............. 348/222.1 |
| 5,602,599 A | 2/1997 | Greggain | |
| 5,974,190 A * | 10/1999 | Maeda et al. ............... 382/255 |
| 6,137,914 A | 10/2000 | Ligtenberg et al. | |
| 6,421,087 B1 * | 7/2002 | Ikeda .......................... 348/345 |
| 6,738,169 B1 | 5/2004 | Nakase | |
| 6,930,711 B2 * | 8/2005 | Fukui et al. ............... 348/225.1 |
| 6,940,620 B2 * | 9/2005 | Jogo .......................... 358/3.26 |
| 7,031,549 B2 * | 4/2006 | Luo ............................ 382/264 |
| 7,136,100 B1 * | 11/2006 | Kato et al. .................. 348/241 |
| 2002/0039142 A1 * | 4/2002 | Zhang ......................... 348/234 |
| 2002/0176113 A1 * | 11/2002 | Edgar ......................... 358/3.27 |

FOREIGN PATENT DOCUMENTS

| | | | |
|---|---|---|---|
| JP | 63-234937 | * | 9/1988 |
| JP | 05-064036 | * | 8/1991 |
| JP | 5-7314 | | 1/1993 |
| JP | 8-107512 | | 4/1996 |
| JP | 8-163408 | | 6/1996 |

(Continued)

OTHER PUBLICATIONS

English language Abstract of JP 8-163408.

(Continued)

*Primary Examiner*—Sinh Tran
*Assistant Examiner*—Christopher K Peterson
(74) *Attorney, Agent, or Firm*—Greenblum & Bernstein, P.L.C.

(57) ABSTRACT

Original image data has original luminance data and color difference data. The original luminance data is separated into first luminance data and second luminance data. The second luminance data undergoes low-pass filter process so as to produce the third luminance data. The first luminance data and the third luminance data are synthesized. Due to this, the soft focus picture image, which consists of the synthesized luminance data and the difference luminance data, is generated.

15 Claims, 7 Drawing Sheets

FOREIGN PATENT DOCUMENTS

| | | | |
|---|---|---|---|
| JP | 08-163408 | * | 6/1996 |
| JP | 9-251532 | | 9/1997 |
| JP | 9-275496 | | 10/1997 |
| JP | 11-298847 | | 10/1999 |
| JP | 2000-59679 | | 2/2000 |
| JP | 2002-44425 | | 2/2002 |

OTHER PUBLICATIONS

English language Abstract of JP 8-107512.
English language Abstract of JP 2002-44425.
English language Abstract of JP 9-275496.
English language Abstract of JP 5-7314.
English language Abstract of JP 11-298847.

* cited by examiner

FILTER PROCESS FOR OBTAINING A SOFT FOCUS PICTURE IMAGE

BACKGROUND OF THE INVENTION

1. Field of the Invention

The present invention relates to a digital image processing device which filters original image data for making a soft focus picture with a digital camera for example.

2. Description of the Related Art

Conventionally, in a silver-halide film camera, a soft focus picture is taken using a soft focus lens. The soft focus picture is a slightly blurred picture, and a flare appears on this picture. But the contours of the object appear clear in this picture. Therefore, the characteristics of the object are sufficiently clear in the soft focus picture.

On the other hand, in a digital camera, an original image taken by the digital camera is processed by using low-pass filter process, so that the original image changes to the soft focus picture image. For example, as shown in Japanese Unexamined Patent Publication (KOKAI) NO. 9-251532, all the image data, namely all the color data (R, G and B), taken by the digital camera, is filtered using a low-pass filter so as to change to the soft focus picture image.

However, if all the color data is filtered, the image loses its overall shape, further the contours of the object in the image become unclear. Therefore, the characteristics of the object are not sufficiently clear in the image. Further, a pseudo color is generated if the color balance of the image is lost in the filtering process.

Furthermore, if all the color data is filtered, the amount of processed data is very large, and hence the process speed is very slow. Therefore, it has been suggested that only one type of color data which is selected from all of the color data (R, G and B), should be filtered for increasing the process speed. But in this case, the color balance is lost and hence an unnatural image is generated.

SUMMARY OF THE INVENTION

Therefore, an object of the present invention is to provide a filtering device which filters original image data for making a soft focus picture image for example.

According to the present invention, there is provided a filtering device which filters original image data, the original image data having original luminance data and color difference data.

The filtering device comprises a generating processor, a filtering processor, and a synthesizing processor. The generating processor generates first luminance data and second luminance data such that the original luminance data is separated into the first luminance data and the second luminance data according to a predetermined ratio. The filtering processor filters the second luminance data so as to transform the second luminance data into third luminance data. The synthesizing processor synthesizes the first luminance data, the color difference data, and the third luminance data.

The filtering device further comprises an image reduction processor and an image restoration processor. The image reduction processor reduces the image resolution corresponding to the second luminance data before the filtering processor filters the second luminance data. The image restoration processor restores the image resolution, which was reduced by the image reduction processor, after the filtering processor filters the second luminance data.

The filtering device further comprises a second filtering processor which filters the second luminance data which has been filtered by the filtering process or once already, after the image restoration processor restores the image resolution.

Preferably, the image resolution can be selected from a stepwise series of predetermined resolutions.

Preferably, the generating processor generates the first luminance data and the second luminance data independently. Furthermore, the original image undergoes a gamma correction using a first gamma curve so as to generate the first luminance data, and the original image undergoes a second gamma correction using a second gamma curve so as to generate the second luminance data, the second gamma curve being different from the first gamma curve.

Preferably, the second gamma curve is selected from a stepwise series of predetermined gamma curves.

Preferably, the predetermined ratio is selected from a stepwise series of predetermined ratios.

The filtering processor filters the second luminance data using a low-pass filter so as to generate a soft focus image. In this case, at least one of the predetermined ratio, the image resolution, and the second gamma curve are changed so as to change the extant of the soft focus of the soft focus image.

According to the present invention, there is provided a digital camera which filters original image data, the original image data having original luminance data and color difference data. The digital camera comprises a generating processor, a filtering processor, and a synthesizing processor.

The generating processor generates first luminance data and second luminance data such that the original luminance data is separated into the first luminance data and the second luminance data according to a predetermined ratio. The filtering processor filters the second luminance data so as to transform the second luminance data into third luminance data. The synthesizing processor synthesizes the first luminance data, the color difference data, and the third luminance data.

According to the present invention, there is provided a method for filtering original image data, the original image data having original luminance data and color difference data.

The method for filtering original image data comprises the steps of generating first luminance data and second luminance data such that the original luminance data is separated into the first luminance data and the second luminance data according to a predetermined ratio, filtering the second luminance data so as to transform the second luminance data into third luminance data, and synthesizing the first luminance data, the color difference data, and the third luminance data.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
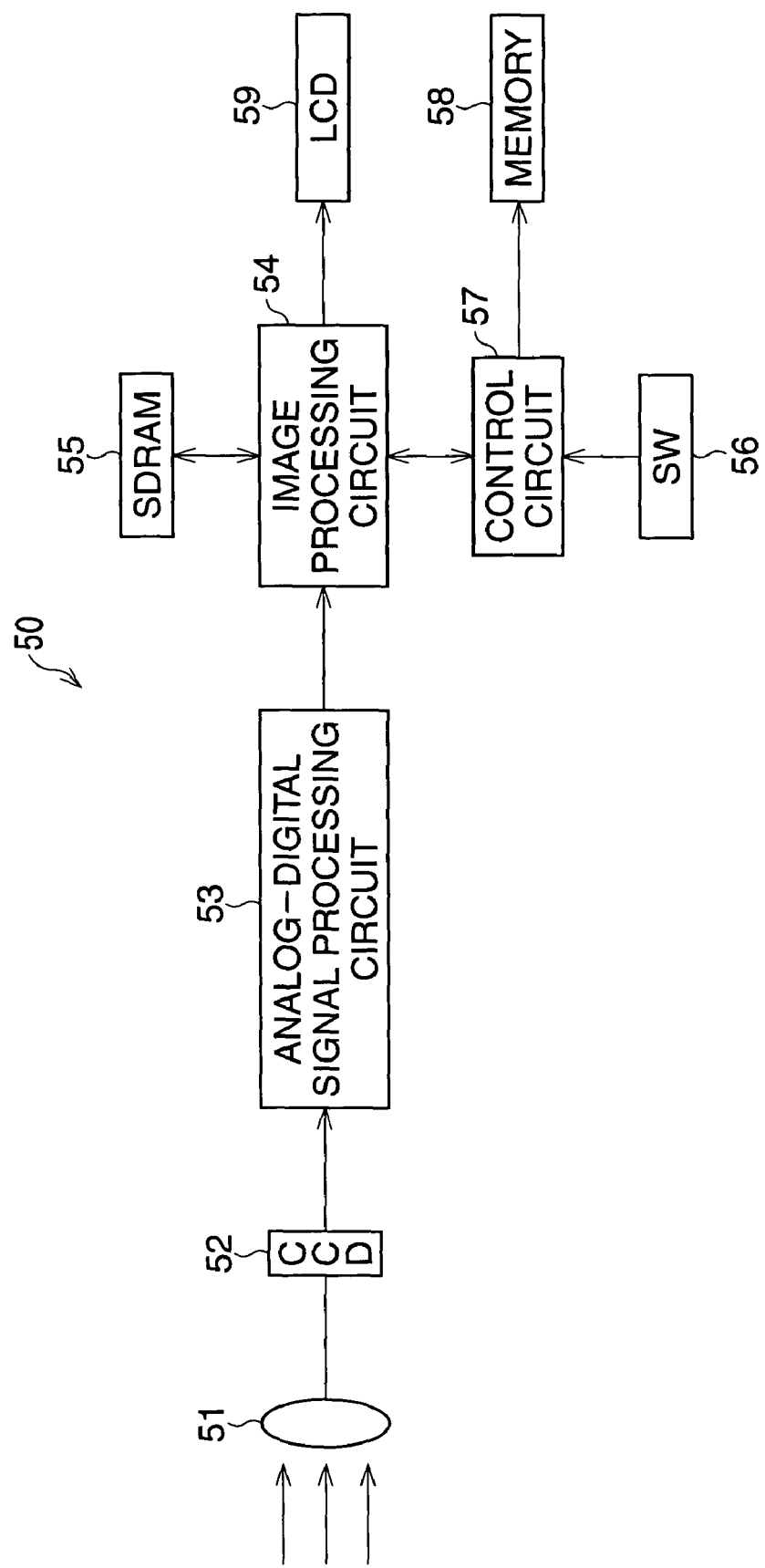
FIG. 1 shows a block diagram of a filtering device in an embodiment according to the present invention.

The present invention will be described below with reference to the embodiments shown in the drawings.

FIG. 1 shows a block diagram of a filtering device 50 in an embodiment according to the present invention. The filtering device 50, which is provided in the digital camera, can make a soft focus picture image.

Light reflected by an object is led through a lens 51 to a CCD 52 having a color filter. At the CCD 52, an electrical charge is generated according to the reflected light. And then an analog signal is generated according to the strength of the electrical charge. The analog signal is sent to an analog-digital signal processing circuit 53. The analog signal is amplified and changed to a digital signal at the analog-digital processing circuit 53. The digital signal is processed according to a predetermined image processing at an image processing circuit 54 to become Bayer data of the original image. The Bayer data is then temporarily stored in a SDRAM 55.

The photograph mode and the detail information are input after a switch 56 is pressed. The detail information concerns the details of the image data process and the conditions when the picture image is taken. At a control circuit 57, control information is calculated according to the photograph mode and the detail information.

If the photograph mode is a soft focus mode, the soft focus level described below as the detail information, is input. The control information, which concerns a YC matrix, an image resolution (an image size), and a gamma curve described below is calculated according to the soft focus level.

The Bayer data stored in the SDRAM 55 is processed according to the control information at the image processing circuit 54. The Bayer data which has been processed is sent to an LCD monitor 59 and the control circuit 57 as processed image data 14 (shown in FIG. 2). The processed image data 14 is encoded in accordance with the JPEG standard at the control circuit 57. The processed image data 14 which is encoded, is memorized in the memory 58 (a Compact Flash Memory (Registered Trademark)).

Figure 2:
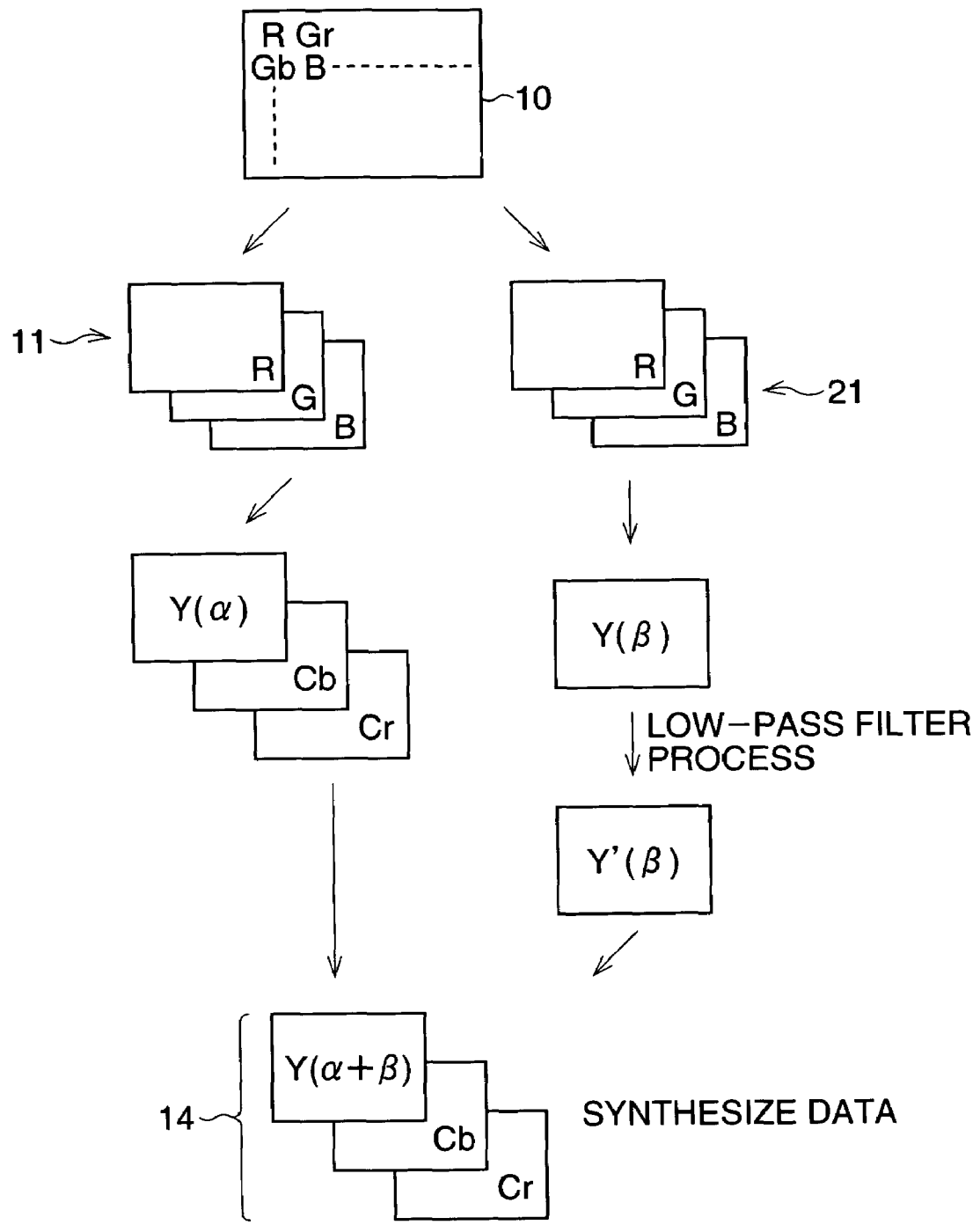
FIG. 2 shows a flowchart of an image process in the embodiment.

FIG. 2 shows a flowchart of an image process in the embodiment. The image process can generate a soft focus picture image. The image process is carried out at the image processing circuit 54 described above. The Bayer data 10 is the image data which is captured by the CCD 52. The adjoining pixels in the Bayer data 10 are interpolated and then a gamma correction is carried out, so as to generate first color data (R, G, and B) 11 and second color data (R, G, and B) 21. A gamma curve which is used in gamma correction for making the first color data 11 is the same as a gamma curve for making the second color data 21 or is different from the gamma curve for making the second color data. If the gamma curves are the same, the first and second color data 11 and 21 are the same.

The first and second color data 11 and 21 are the image data which follow the formality of the RGB 4:4:4 for example. The number of the image pixels for each color R, G, and B regarding the first and second color data 11 and 21 is the same as the number of the image pixels corresponding to the Bayer data 10.

The first color data 11 is changed to a first luminance data Y ($\alpha$) and color difference data Cb and Cr, using a first YC matrix described below. The second color data 21 is changed to a second luminance data Y ($\beta$) and color difference data Cb' and Cr', using a second YC matrix described below. The color difference data Cb' and Cr' are deleted because these are not used.

The first luminance data Y ($\alpha$) and the color difference data Cb and Cr follow the formality of the Y Cb Cr 4:2:2. The number of the image pixels corresponding to the first luminance data Y ($\alpha$) is the same as the number of image pixels corresponding to the Bayer data 10. The number of the image pixels in the color difference data Cb equals to half the number of image pixels in the Bayer data 10. Further, the number of the image pixels in the color difference data Cr equals to half the number of image pixels in the Bayer data 10. The second luminance data Y ($\beta$) and the color difference data Cb' and Cr' are similar to Y ($\alpha$), Cb and Cr.

The second luminance data Y ($\beta$) is filtered using a low-pass filter described below, so that the second luminance data Y ($\beta$) is changed to third luminance data Y' ($\beta$). Due to this filtration, the image corresponding to the luminance data becomes slightly blurred, and the contour of the object on the image becomes unclear.

The first luminance data Y ($\alpha$) and the color difference data Cb and Cr are not filtered using a low-pass filter. Therefore, the object image corresponding to the data Y ($\alpha$), Cb, and Cr has clear contours, and the characteristics of the object can be clearly seen in the image.

Next, the third luminance data Y' ($\beta$), the first luminance data Y ($\alpha$), and the color difference data Cb and Cr are synthesized into the processed image data 14.

Namely, the third luminance data Y' ($\beta$) added to first luminance data Y ($\alpha$) makes the luminance data Y ($\alpha+\beta$). Due to this addition, the processed image data 14, which is formed from the luminance data Y ($\alpha+\beta$) and the color difference data Cb and Cr, is obtained.

The luminance data Y ($\alpha+\beta$) consists of the first luminance data Y ($\alpha$) which is not filtered by the low-pass filter and the third luminance data Y' ($\beta$) which is filtered by the low-pass filter. In other words, the image of the processed image data 14 consists of the image which has clear contours, and the image which is slightly blurred and which has unclear contours. Therefore, the image, which is obtained in this embodiment, does not only have clear contours but also is slightly blurred. Namely, the soft focus picture image, which is similar to the soft focus picture taken by the silver-halide film camera, can be obtained easily with a digital camera.

In this case, when the first luminance data Y ($\alpha$) and second luminance data Y ($\beta$) are generated, the original luminance data Y is separated into first luminance data Y ($\alpha$) and second luminance data Y ($\beta$) according to a predetermined ratio. Therefore, the luminance of the soft focus picture image can be substantially same as the luminance of the original image. Due to this, the image of the processed image data 14 can maintain the balance of the original luminance and the original color difference data. Further, the color difference data Cb and Cr do not undergo a low-pass filter process, so that the color balance can be kept. Therefore, a pseudo color is not generated.

As described above, in this embodiment, in the digital camera, the soft focus picture image, having clear contours of the object and not having any pseudo colors, can be obtained in a similar way to that in the silver-halide film camera.

A first YC matrix is shown in formula (1). A second YC matrix is shown in Formula (2). The luminance data and the color difference data of the original image are shown in Formulas (3) to (5).

$$\begin{pmatrix} Y(\alpha) \\ Cb \\ Cr \end{pmatrix} = \begin{pmatrix} 0.297\alpha & 0.586\alpha & 0.113\alpha \\ -0.168 & -0.332 & 0.500 \\ 0.500 & -0.422 & -0.082 \end{pmatrix} \begin{pmatrix} R \\ G \\ B \end{pmatrix} \quad (1)$$

$$\begin{pmatrix} Y(\beta) \\ Cb' \\ Cr' \end{pmatrix} = \begin{pmatrix} 0.297\beta & 0.586\beta & 0.113\beta \\ -0.168 & -0.332 & 0.500 \\ 0.500 & -0.422 & -0.082 \end{pmatrix} \begin{pmatrix} R \\ G \\ B \end{pmatrix} \quad (2)$$

$$Y = 0.297R + 0.586G + 0.113B \quad (3)$$

$$Cb = -0.168R - 0.332G + 0.500B \quad (4)$$

$$Cr = 0.500R - 0.422G - 0.082B \quad (5)$$

The first color data is changed to the first luminance data Y ($\alpha$) and the color difference data Cb and Cr, using the first YC matrix. The second color data is changed to the second luminance data Y ($\beta$) and the color difference data Cb' and Cr', using the second YC matrix.

A coefficient $\alpha$ added to a coefficient $\beta$ ($\alpha$ and $\beta$ shown in formulas (1) and (2)) equals 1 (namely $\alpha + \beta = 1$). Therefore, if the first color data 11 is the same as the second color data 21, the first luminance data Y ($\alpha$) added to the second luminance data Y ($\beta$) makes the luminance data Y of the original data shown in formula (3).

Further, in this embodiment the two color data 11 and 21 are generated, but only one color data need be generated. In this case, only one color data has to be changed to the luminance data Y and the color difference data Cb and Cr. In this case, the luminance data Y is divided into the first luminance data Y ($\alpha$) and the second luminance data Y ($\beta$), so as to generate the first and second luminance data Y ($\alpha$) and Y ($\beta$).

Figure 3:
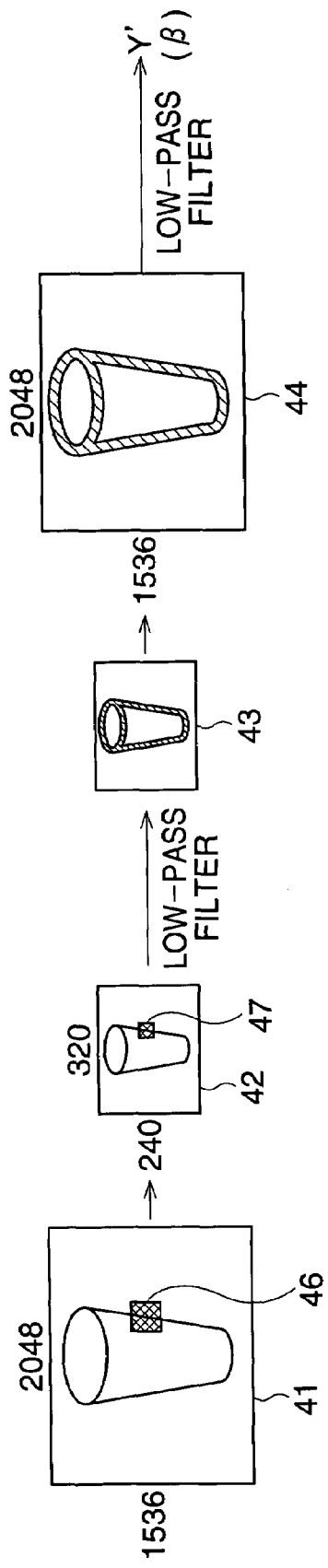
FIG. 3 shows a flowchart of the process for generating third luminance data.

FIG. 3 shows the process flow including low-pass filter process, for getting the third luminance data Y' ($\beta$) from the second luminance data Y ($\beta$). A luminance image 41 corresponds to the second luminance data Y ($\beta$). In this embodiment, the luminance image 41 consists of 2048×1536 pixels for example. The image resolution of the luminance image 41 is reduced by a common method, so that the luminance image 41 is changed to the low resolution image 42 consisting of 320×240 pixels for example. The image size (the number of the pixels) of the low resolution image 42 is determined by the detail information input from the switch 56 (shown in FIG. 1).

Each pixel data of the low resolution image 42 is filtered by a low-pass filter using a 3×3 matrix at predetermined times. Due to this, the low resolution image 42 changes to an LPF image 43 consisting of 320×240 pixels. In the LPF image 43, the contours of the object are not clear, because the image has been filtered by a low-pass filter.

Next, the image resolution of the LPF image 43 is restored by a common method. The LPF image 43 changes to a restoration image 44 consisting of the same number of pixels as the luminance image 41 (namely 2048×1536 pixels). Further, the data of the restoration image 44 is filtered by a low-pass filters at predetermined times, so that the noise, which is generated when the image resolution is restored, is deleted. Due to this, third luminance data Y' ($\beta$) is obtained. Further, common filters are used as the low-pass filters described above.

The low-pass filter can more effectively make an image blurred after the image resolution is reduced than if the image resolution is not reduced, if the same matrix (for example 3×3) is used. Therefore, in this embodiment, the second luminance data Y ($\beta$) is filtered with a low-pass filter, after the image resolution corresponding to the second luminance data is reduced. Why it is effective to use a low-pass filter to filter the image data whose resolution is reduced, will be explained in detail next.

One pixel 47 on the low resolution image 42 corresponds to the area 46 of several pixels on the luminance image 41 whose resolution is not reduced. Therefore, the 3×3 matrix refers to a larger area if the image resolution has been reduced than if it not reduced. Namely, even if the number of pixels referred to in matrix is small (such as the 3×3 matrix=9 pixels), one low-pass filter can make the image blurred as effectively as if there were many pixels referred to in the matrix, for example 10 by 10 matrix (the number of pixels referred to is the hundreds). Of course, the low-pass filter process speed is very high, if the number of pixels referred to in matrix is small.

As described above, in this embodiment, the image whose resolution is reduced is given the low-pass filter process, so that the image can become blurred sufficiently though process speed is very high.

Figure 4:
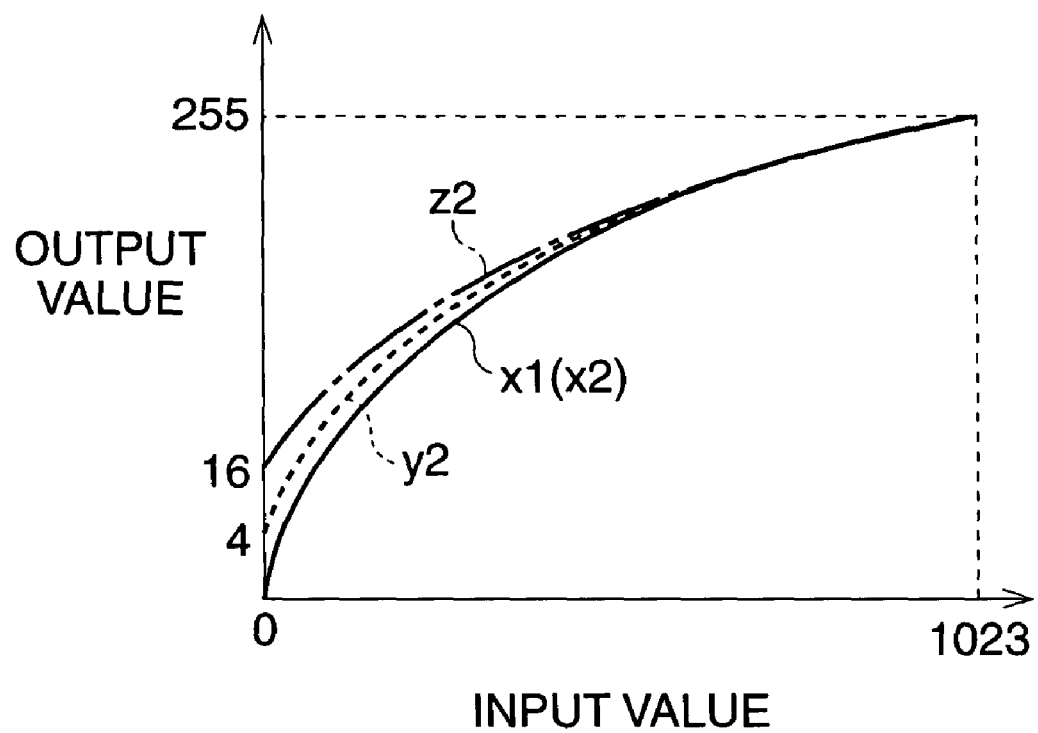
FIG. 4 shows a graph of the first and second gamma curves.

FIG. 4 shows the graph of the first and second gamma curves. The Bayer data 10 undergoes a gamma correction using the first gamma curve so as to produce the first color data 11. The Bayer data 10 undergoes gamma correction using the second gamma curve so as to produce the second color data 21. In this embodiment, an input amount is 10 bits and an output amount is 8 bits as shown in FIG. 4.

The first gamma curve is always the gamma curve x1. Namely, the contrast of the first color data 11 is always adjusted according to curve x1. Further, the gamma curve x1 is usually used for obtaining the image.

The second gamma curve is selected from stepwise series of predetermined gamma curves x2, y2, or z2. Which curve is selected is instituted by the detail information input from the switch 56 (shown in FIG. 1). Namely, the contrast of the second color data 21 is adjusted according to detail information.

The gamma curve x2 is the same as the first gamma curve x1. The offset of the gamma curve x1 and x2 shown in FIG. 4 is zero. Therefore, if an input value is zero, an output is zero too. On the other hand, the offsets of the gamma curve y2 and z2 are 4 and 16 respectively, therefore, if the input value is zero the output value is 4 or 16 respectively. In the y2 and z2, the larger the input value, the larger the output value, but the rate of increase of the output values is smaller than the rate in the x1 and x2, therefore the curve y2 and z2 overlap the curve x1 when the input values are predetermined values.

When the second color data 21 is generated using the gamma curve y2 as the second gamma curve, even if the input value of the pixel is very small, the output value of the pixel is comparatively large as shown in FIG. 4. Therefore, a flare appears all over the image corresponding to the second color data 21, because all of the pixels have a color data output value which is comparatively large. Due to this, the flares appear on the images corresponding to the second luminance data Y ($\beta$) and the third luminance data Y' ($\beta$), namely, the flare appears also on the soft focus picture image which is obtained by the image process in this embodiment, and the soft focus picture image always produces a flare effect. If the gamma curve z2 is used, the soft focus picture image always has a flare effect as well, further, this flare effect is greater than when using curve y2, because the offset value of the curve z2 is larger than the offset value of the curve y2.

Described above, in this embodiment, the first color data (the first luminance data Y ($\alpha$)) and the second color data (second luminance data Y ($\beta$)) are generated independently using the first and second gamma curve respectively, and the second gamma curve can be selected from a stepwise series of predetermined gamma curves. Therefore, the flare can appear on the soft focus picture image according to the desire of the user.

Figure 5:
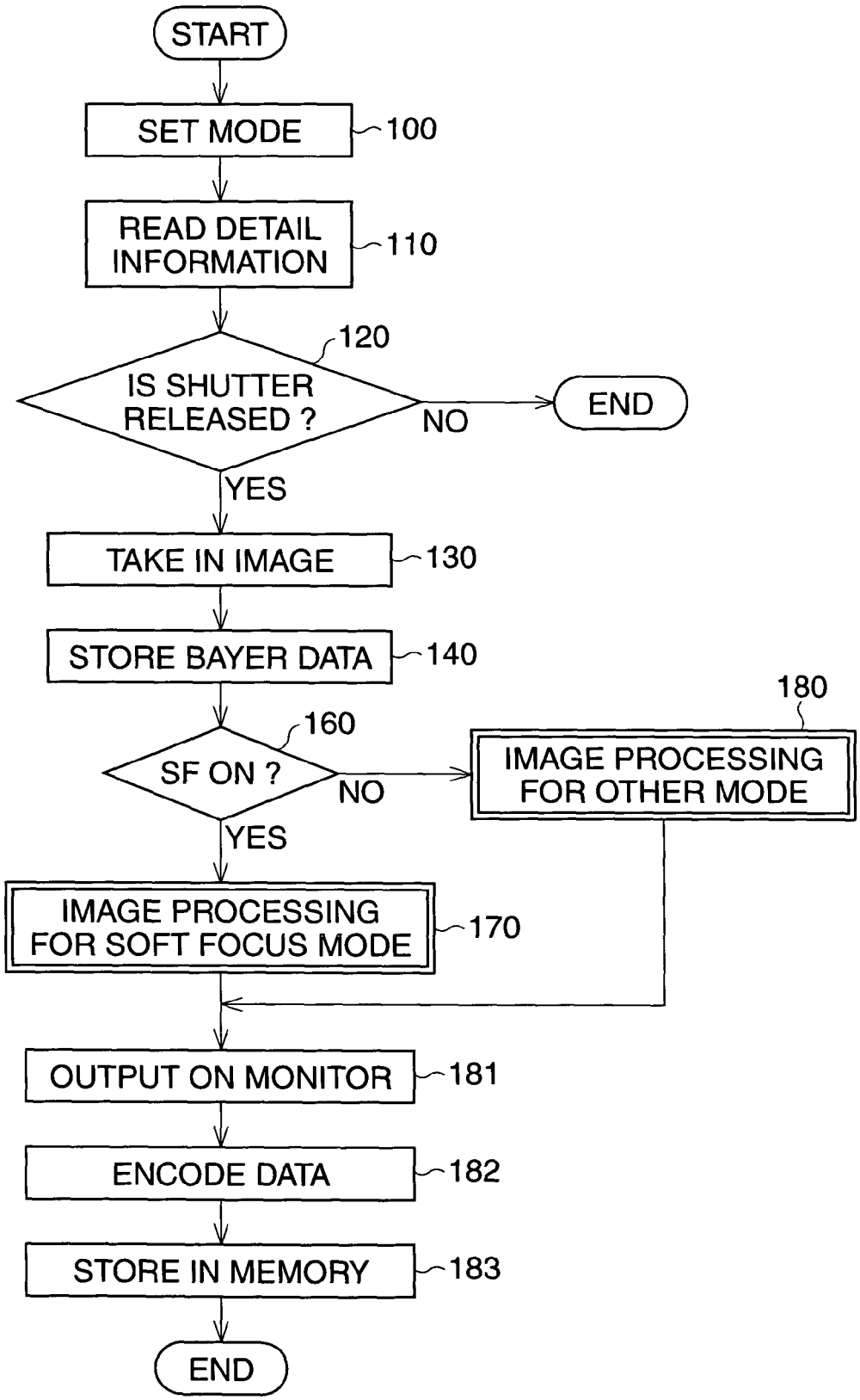
FIG. 5 shows a flowchart of the image processing routine.
Figure 6:
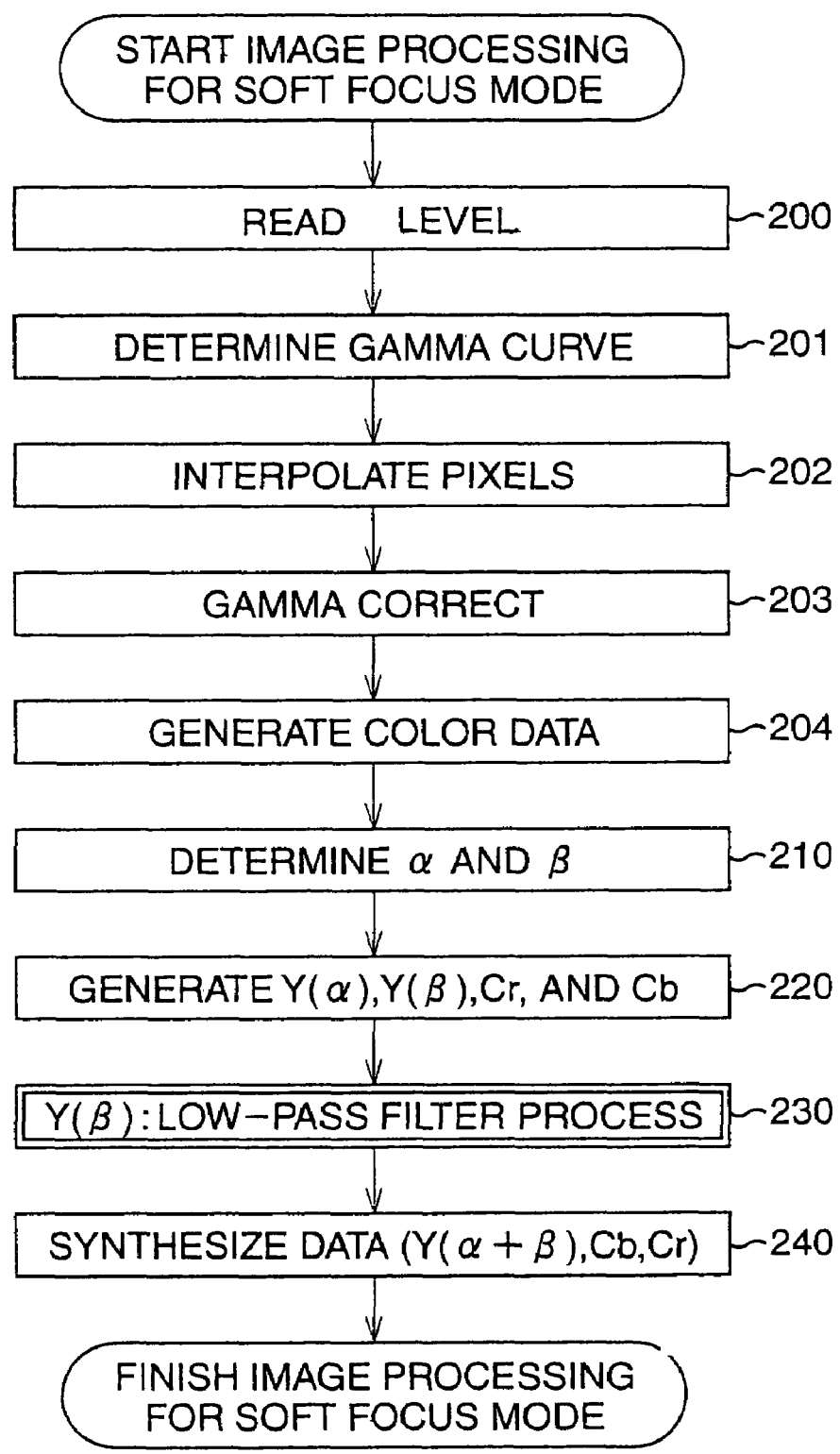
FIG. 6 shows a flowchart of the image processing routine in the soft focus mode.
Figure 7:
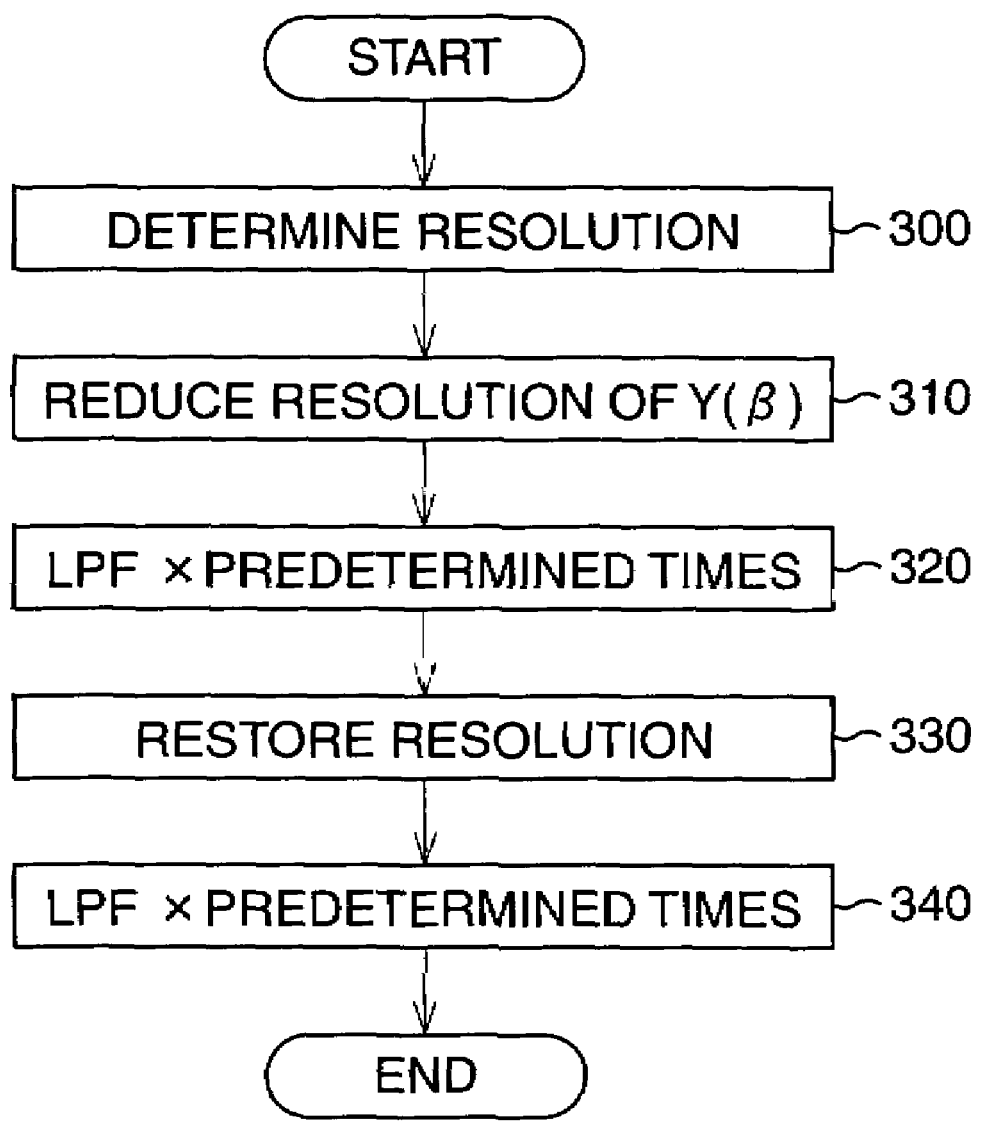
FIG. 7 shows a flowchart of the low-pass filter process routine.

FIGS. 5, 6, and 7 show the flow chart of the image processing routine in the filtering device 50. In this routine, as shown in FIG. 5, at step 100, the photograph mode is selected from the ordinary photograph mode, the macro mode, or the soft-focus mode etc. according to the input from the switch 56 (shown in FIG. 1). Namely, at step 100, the photograph mode is set.

At step 110, the detail information which is input from the switch 56 is read. If the photograph mode is the soft-focus mode, the soft focus level as the detail information is input from the switch 56. The soft focus level is selected from 5 step levels (from 0 to 4). The detail setting is determined according to the soft focus level at step 201, 210, and 300 described below. As shown in Table 1, the coefficients a and β, the image size after reducing the image resolution, and the second gamma curve are determined as the detail settings. Note, the gamma curve x2, y2, and z2 shown in FIG. 4 correspond to x2, y2, and z2 in Table 1 respectively.

[Table 1]

| Soft focus Level | $\alpha$ | $\beta$ | Image Size | $\gamma$ curve |
|---|---|---|---|---|
| 0 | 0.8 | 0.2 | 640 × 480 | x2 |
| 1 | 0.6 | 0.4 | 480 × 320 | x2 |
| 2 | 0.4 | 0.6 | 320 × 240 | x2 |
| 3 | 0.3 | 0.7 | 320 × 240 | y2 |
| 4 | 0.15 | 0.85 | 320 × 240 | z2 |

At step 120, whether a shutter button is pushed, namely, whether a shutter is released is determined. If the shutter is not released, the image processing routine finishes. If the shutter is released, the image is taken in by the CCD 52 at step 130, the image data is processed in the analog-digital signal processing circuit 53, and then the image data is stored in the SDRAM 55 as the Bayer data 10 at step 140. At step 160, whether the photograph mode which is input at step 100 is the soft focus mode is determined. If the mode is the soft focus mode, the Bayer data 10 is given the image processing for the soft focus mode at step 170 (shown in FIG. 6). Unless the mode is soft focus mode, the Bayer data 10 is given the image processing for the other than soft focus mode at step 180. The processed image data 14 which is processed at step 170 or 180 is output on the LCD monitor 59 at step 181. At step 182, the processed image data 14 is encoded in accordance with JPEG standard. Next, at step 183, the encoded processed image data 14 is stored on the memory 58, and then, the image processing routine in this embodiment finishes.

FIG. 6 shows a flowchart of the image processing routine in the soft focus mode at step 170. If the image processing starts for the soft focus mode, the soft focus level, which is determined at step 110, is read at step 200. At step 201, the second gamma curve is determined according to the soft focus level as show in Table 1.

At step 202, the adjoining pixels of the Bayer data 10 (shown in FIG. 2) are interpolated by a common method.

At step 203, the interpolated data is gamma corrected using the first gamma curve x1 so as to produce the first color data 11 at step 204. Similarly, at step 203 the interpolated data is gamma corrected using the second gamma curve determined at step 201 so as to produce the second color data 21 at step 204. Namely, at step 204, two color data 11 and 21 are generated.

At step 210, the coefficients α and β are determined according to the soft focus level as shown in Table 1. The luminance data of the original image is separated into the first luminance data Y (α) and the second luminance data Y (β) according to the ratio of α to β as described above.

At step 220, not only are the color difference data Cb and Cr generated, but also the first luminance data Y (α) and the second luminance data Y (β) are generated.

At step 230, the second luminance data Y (β) is given the low-pass filter process shown in FIG. 7, so that the third data Y' (β) is generated. After the low-pass filter process, at step 240, the first luminance data Y (α) added the third luminance data Y' (β) makes the luminance data Y (α+β). Due to this, at step 240, the processed image data 14 having the color difference data Cb and Cr and the luminance data Y (α+β), is generated. If Step 240 has finished, the image processing for the soft focus mode finishes.

FIG. 7 shows the flowchart of the low-pass filter process routine at step 230. If the low-pass filter process starts, the image resolution which is reduced at step 310 is determined at step 300. Namely, at step 300, the image size (the number of the pixels) of the low resolution image 42 (shown in FIG. 3) is determined according to the soft focus level as shown in Table 1. At step 310, the image resolution of the luminance image 41 (shown in FIG. 3) corresponding to the second luminance data Y (β), is reduced, and then the luminance image 41 is changed to the low resolution image 42 whose size is determined at step 300.

At step 320, the second luminance data Y (β), to which the low resolution image 42 corresponds, is filtered with a low-pass filter at predetermined times. Due to this, the low resolution image 42 changes to the LPF image 43 (shown in FIG. 3).

At step 330, the image resolution of the LPF image 43 is restored to the image resolution of the original image. Due to this, the LPF image 43 changes to a restoration image 44 (shown in FIG. 3). At step 340, the luminance data corresponding to the restoration image 44 is filtered with low-pass filters at predetermined times. Due to this, third luminance data Y' (β) is generated and the low-pass filter process routine finishes.

As shown in the flowchart of the image processing routine, in this embodiment, the predetermined ratio (namely, α and β) for separating the original luminance data Y into the first luminance data Y (α) and the second luminance data Y (β), the image resolution in low-pass filter process, and the second gamma curve which is used when the second luminance data Y (β) is generated, can be selected from a stepwise series. Due to this, the extant of the soft focus of the soft focus picture image can be set stepwise and easily. Namely, in this embodiment, the soft focus picture image can be provided according to the characteristics of the object or the desire of the user.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2002-266979 (filed on Sep. 12, 2002) which is expressly incorporated herein, by reference, in its entirety.

The invention claimed is:

1. A filter which filters original image data, said original image data having original luminance data and color difference data, comprising:

a generating processor that generates first luminance data and second luminance data such that said original luminance data is separated into said first luminance data and said second luminance data according to a predetermined ratio, wherein said original image data undergoes a gamma correction using a first gamma curve so as to generate said first luminance data, and said original image data undergoes a second gamma correction using a second gamma curve so as to generate said second luminance data, said second gamma curve being different from said first gamma curve, wherein said second gamma curve is selected from a stepwise series of predetermined resolutions, and wherein said first gamma curve has a zero offset, and said second gamma curve has a non-zero offset;

a filtering processor that filters said second luminance data by a low-pass filter so as to transform said second luminance data into third luminance data while the first luminance data and the color difference data are not low-pass filtered; and a synthesizing processor that synthesizes said first luminance data, said color difference data, and said third luminance data into synthesized image data, without synthesizing filtered color difference data, wherein the third luminance data defines a blurred luminance image and the synthesized image data comprises a soft focus image in which the color balance of the original image data is preserved, and wherein said second gamma curve is changed so as to change the extent of the soft focus of said soft focus image.

2. A filter according to claim 1, further comprising:

an image reduction processor which reduces an image resolution corresponding to said second luminance data before said filtering processor filters said second luminance data; and an image restoration processor which restores the image resolution, which has been reduced by said image reduction processor, after said filtering processor filters said second luminance data.

3. A filter according to claim 2, further comprising:

a second filtering processor which filters said second luminance data which has been filtered by said filtering processor once already, after said image restoration processor restores said image resolution.

4. A filter according to claim 2, wherein said image resolution is selectable from a stepwise series of predetermined resolutions.

5. A filter according to claim 1, wherein said predetermined ratio is selected from a stepwise series of predetermined ratios.

6. A filter according to claim 5, further comprising:

an image reduction processor which reduces an image resolution corresponding to said second luminance data before said filtering processor filters said second luminance data; and an image restoration processor which restores the image resolution, which has been reduced by said image reduction processor, after said filtering processor filters said second luminance data.

7. A filter according to claim 6, wherein at least one of said predetermined ratio and said image resolution is changed so as to change the extent of the soft focus of said soft focus image.

8. A digital camera which filters original image data, said original image data having original luminance data and color difference data, comprising:

a generating processor that generates first luminance data and second luminance data such that said original luminance data is separated into said first luminance data and said second luminance data according to a predetermined ratio, and that performs a first gamma correction on said original image data utilizing a first gamma curve so as to generate said first luminance data and performs a second gamma correction on said original image data using a second gamma curve so as to generate said second luminance data, said second gamma curve being different from said first gamma curve, wherein said second gamma curve is selected from a stepwise series of predetermined resolutions, and wherein said first gamma curve has a zero offset, and said second gamma curve has a non-zero offset;

a filtering processor that filters said second luminance data by a low-pass filter so as to transform said second luminance data into third luminance data while the first luminance data and the color difference data are not low-pass filtered; and a synthesizing processor that synthesizes said first luminance data, said color difference data, and said third luminance data into synthesized image data, without synthesizing filtered color difference data, wherein the third luminance data defines a blurred luminance image and the synthesized image data comprises a soft focus image in which the color balance of the original image data is preserved, and wherein said second gamma curve is changed so as to change the extent of the soft focus of said soft focus image.

9. The digital camera according to claim 8, wherein said predetermined ratio is selected from a stepwise series of predetermined ratios.

10. The filter according to claim 8, further comprising:

an image reduction processor which reduces an image resolution corresponding to said second luminance data before said filtering processor filters said second luminance data; and an image restoration processor which restores the image resolution, which has been reduced by said image reduction processor, after said filtering processor filters said second luminance data.

11. The filter according to claim 10, wherein at least one of said predetermined ratio and said image resolution is changed so as to change the extent of the soft focus of said soft focus image.

12. A filter processing method for filtering original image data, the original image data having original luminance data and color difference data, the method comprising:

generating first luminance data and second luminance data such that the original luminance data is separated into the first luminance data and the second luminance data according to a predetermined ratio, performing a first gamma correction on the original image data utilizing a first gamma curve so as to generate the first luminance data and performing a second gamma correction on the original image data using a second gamma curve so as to generate the second luminance data, the second gamma curve being different from the first gamma curve, wherein said second gamma curve is selected from a stepwise series of predetermined resolutions, and wherein said first gamma curve has a zero offset, and said second gamma curve has a non-zero offset;

low-pass filtering the second luminance data so as to transform the second luminance data into third luminance data without low-pass filtering of the first luminance data and the color difference data; and synthesizing, by a processor, the first luminance data, the color difference data, and the third luminance data into synthesized image data, without synthesizing filtered color difference data, wherein the third luminance data defines a blurred luminance image and the synthesized image data comprises a soft focus image in which the color balance of the original image data is preserved, and wherein said second gamma curve is changed so as to change the extent of the soft focus of said soft focus image.

13. The filter processing method according to claim 12, further comprising selecting the predetermined ratio from a stepwise series of predetermined ratios.

14. The filter processing method according to claim 12, further comprising reducing an image resolution corresponding to the second luminance data before the low pass filtering of the second luminance data and restoring the image resolution, which has been reduced, after the low pass filtering of the second luminance data.

15. The filter processing method according to claim 14, wherein at least one of the predetermined ratio and the image resolution is changed so as to change the extent of the soft focus of the soft focus image.

* * * * *